US011738708B2

(12) United States Patent
Ugarte Alba

(10) Patent No.: US 11,738,708 B2
(45) Date of Patent: Aug. 29, 2023

(54) AIRBAG MODULE FOR A VEHICLE OCCUPANT RESTRAINT SYSTEM, AND METHOD FOR OPERATING A VEHICLE OCCUPANT RESTRAINT SYSTEM COMPRISING SUCH AN AIRBAG MODULE

(71) Applicant: DALPHI METAL ESPANA S.A., Vigo (ES)

(72) Inventor: Óscar Ugarte Alba, Valladolid (ES)

(73) Assignee: DALPHI METAL ESPANA S.A., Vigo (ES)

( * ) Notice: Subject to any disclaimer, the term of this patent is extended or adjusted under 35 U.S.C. 154(b) by 82 days.

(21) Appl. No.: 17/426,734

(22) PCT Filed: Jan. 29, 2020

(86) PCT No.: PCT/EP2020/052086
§ 371 (c)(1),
(2) Date: Jul. 29, 2021

(87) PCT Pub. No.: WO2020/157090
PCT Pub. Date: Aug. 6, 2020

(65) Prior Publication Data
US 2022/0097643 A1 Mar. 31, 2022

(30) Foreign Application Priority Data
Jan. 30, 2019 (DE) .......................... 102019102372.6

(51) Int. Cl.
*B60R 21/2338* (2011.01)
*B60R 21/015* (2006.01)
(Continued)

(52) U.S. Cl.
CPC .... *B60R 21/2338* (2013.01); *B60R 21/01512* (2014.10); *B60R 21/2035* (2013.01);
(Continued)

(58) Field of Classification Search
CPC .............. B60R 21/2338; B60R 21/239; B60R 2021/23384; B60R 2021/2395
See application file for complete search history.

(56) References Cited

U.S. PATENT DOCUMENTS 6,832,778 B2 * 12/2004 Pinsenschaum .... B60R 21/2338
280/739
9,199,602 B1 * 12/2015 Fischer ................. B60R 21/239
(Continued)

FOREIGN PATENT DOCUMENTS

DE 102005027310 A1 12/2006
DE 102008007656 A1 8/2009
(Continued)

OTHER PUBLICATIONS

PCT International Search Report for corresponding International Application Serial No. PCT/EP2020/052086, dated Mar. 26, 2020, pp. 1-4.

*Primary Examiner* — Drew J Brown
*Assistant Examiner* — Matthew Joseph Ganci
(74) *Attorney, Agent, or Firm* — TAROLLI, SUNDHEIM COVELL & TUMMINO L.L.P.

(57) ABSTRACT

The invention relates to an airbag module (10) for a vehicle occupant restraint system (12), comprising an airbag (14), an inflator (18), a shaping tether (22) for influencing the airbag deployment geometry which is connected to the airbag (14) at one tether end, and comprising a port release tether (20) which is connected to a discharge port closure (26) of the airbag (14) at one tether end, wherein the port release tether (20) is connected to the discharge port closure (26) so that it releases a discharge port (28) of the airbag (14) from a predetermined tensile tether force, and wherein an activatable tether release device (24) coupled both to the shaping tether (22) and to the port release tether (20) is provided for actively releasing the tethers (20, 22). Furthermore, the (Continued)

invention relates to a method of operating a vehicle occupant restraint system (12) comprising said airbag module (10), wherein airbag deployment takes place in response to predetermined basic conditions, such as in response to the weight of a vehicle occupant (16) and/or of a driving mode for manual or automated and, resp., autonomous driving.

13 Claims, 5 Drawing Sheets

(51) Int. Cl.
    *B60R 21/203*      (2006.01)
    *B60R 21/239*      (2006.01)

(52) U.S. Cl.
    CPC .... *B60R 21/239* (2013.01); *B60R 2021/2395* (2013.01); *B60R 2021/23384* (2013.01)

(56) References Cited

U.S. PATENT DOCUMENTS

| | | |
|---|---|---|
| 2004/0012179 A1 | 1/2004 | Pinsenschaum et al. |
| 2009/0309341 A1 | 12/2009 | Pausch |
| 2010/0090450 A1 | 4/2010 | Webber |
| 2011/0031723 A1 | 2/2011 | Fischer et al. |
| 2016/0325706 A1* | 11/2016 | Haas .................. B60R 21/2342 |

FOREIGN PATENT DOCUMENTS

| | | |
|---|---|---|
| DE | 102010001502 A1 | 8/2011 |
| JP | 2002211348 A | 7/2002 |
| JP | 2007091018 A | 4/2007 |
| JP | 2010006237 A | 1/2010 |
| JP | 2011031656 A | 2/2011 |

\* cited by examiner

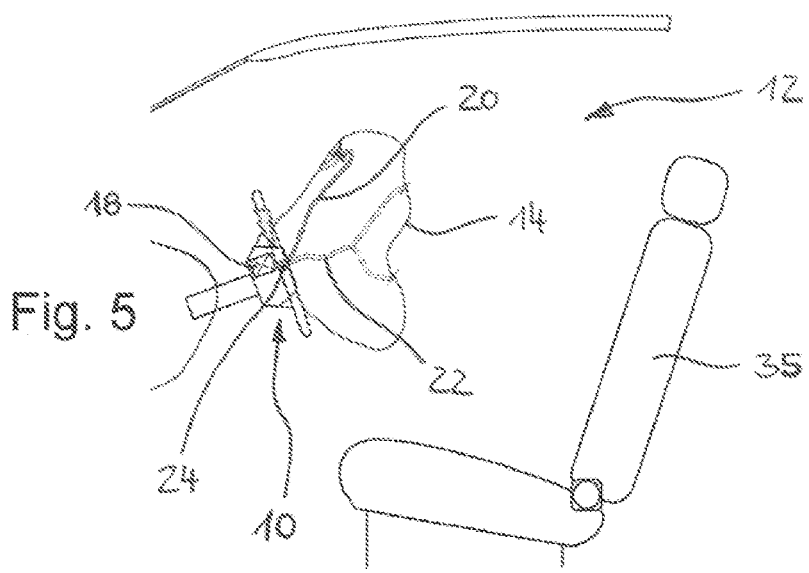
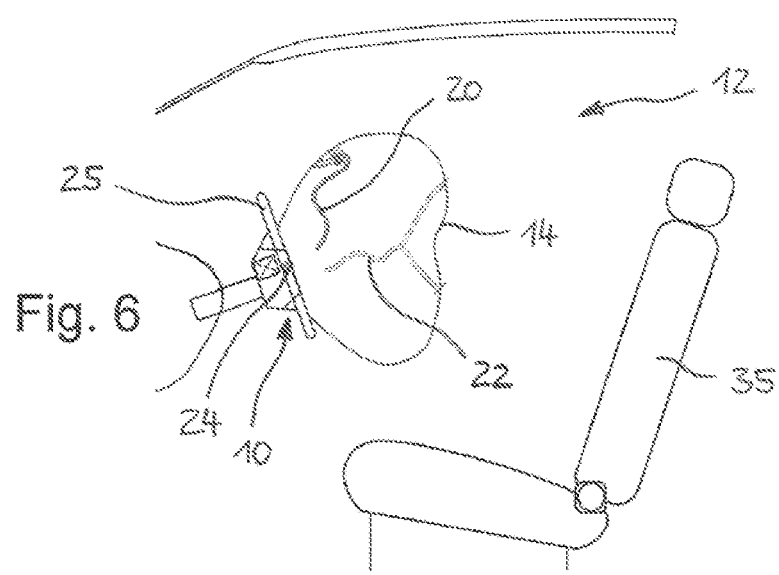
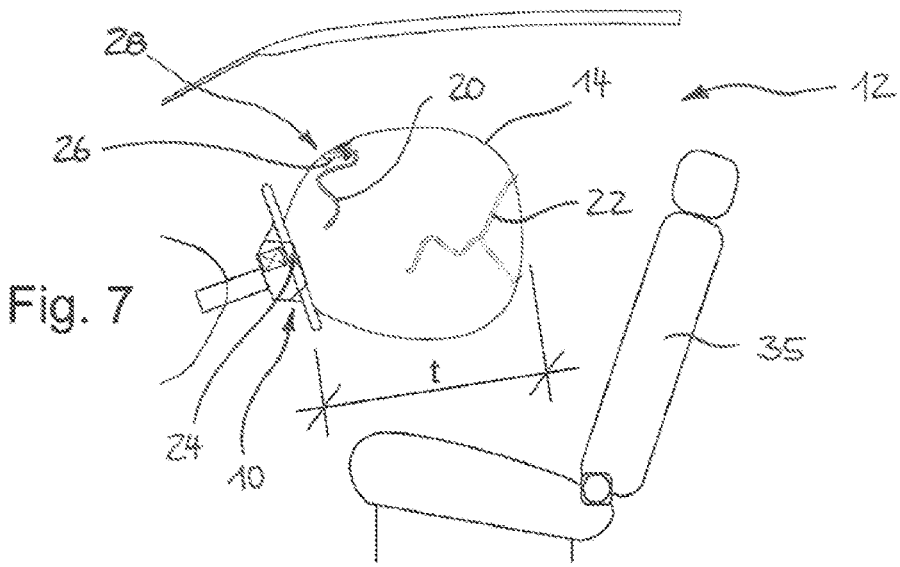

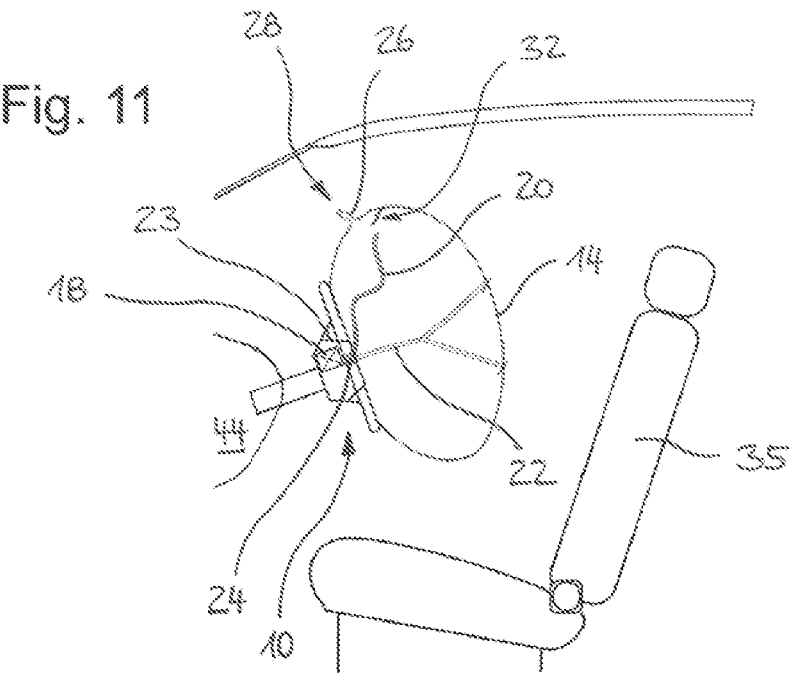
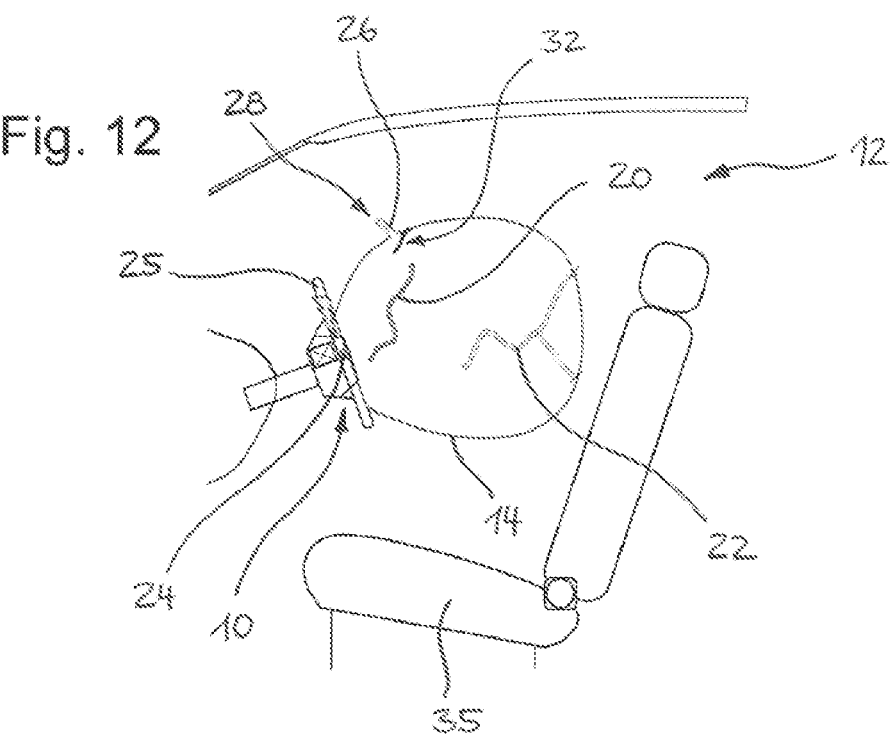

AIRBAG MODULE FOR A VEHICLE OCCUPANT RESTRAINT SYSTEM, AND METHOD FOR OPERATING A VEHICLE OCCUPANT RESTRAINT SYSTEM COMPRISING SUCH AN AIRBAG MODULE

RELATED APPLICATIONS

The present invention is a U.S. National Stage under 35 USC 371 patent application, claiming priority to Serial No. PCT/EP2020/052086, filed on 29 Jan. 2020; which claims priority from 10 2019 102 372.6, filed 30 Jan. 2019, the entirety of both of which are incorporated herein by reference.

BACKGROUND OF THE INVENTION

The invention relates to an airbag module for a vehicle occupant restraint system as well as to a method of operating a vehicle occupant restraint system comprising said airbag module, the airbag module comprising an airbag for restraining a vehicle occupant, an inflator for filling the airbag with inflator gas, a shaping tether for influencing the airbag deployment geometry which is connected to the airbag at one tether end, as well as a port release tether which is connected to a discharge port closure of the airbag at one tether end and releases a discharge port of the airbag from a predetermined tensile tether force.

The use of tethers for influencing the outer contour and/or the internal pressure of airbags is generally known. Furthermore, in the state of the art already numerous vehicle occupant restraint systems are described in which a concrete tether can be actively released by a release mechanism so as to improve the restraining effect of the airbag in response to basic conditions detected by sensors such as the vehicle deceleration, the occupant weight or the occupant position.

SUMMARY OF THE INVENTION

It is the object of the invention to provide an airbag module and a method of operating a vehicle occupant restraint system comprising said airbag module in which, in response to predetermined basic conditions, the shape and/or the hardness of the inflated airbag can be reliably adapted with little effort so as to achieve an especially advantageous restraining effect.

According to the invention, this object is achieved by an airbag module of the afore-mentioned type in which the port release tether is connected to the discharge port closure so that it releases a discharge port of the airbag from a predetermined tensile tether tension, with an activatable tether release device coupled both to the shaping tether and to the port release tether being provided for active release, especially for simultaneous active release of the tethers. Of preference, the shaping tether varies exclusively the airbag deployment geometry, especially an airbag depth without influencing a discharge port.

In this airbag module, consequently plural tethers having different functions (shaping/port release) are provided which can be actively released jointly by one single tether release device. Furthermore, a discharge port of the airbag may also be passively released when a predetermined tensile force is exceeded in the port release tether. This combination of active and passive control as well as the use of functionally different tethers enables the airbag deployment to be adapted especially advantageously to predetermined basic conditions with little effort, as will be explained in detail below.

In one embodiment of the airbag module, the tether release device is arranged at the inflator or at a module housing so that the shaping tether and the port release tether are detachably fixed to the inflator or the module housing via the tether release device. Both the inflator and the module housing of the airbag module are stable components which are present anyway and at which reliable mounting of the tethers and of the activatable tether release device is easily possible with little effort.

Preferably, the tether end of the port release tether is connected to the discharge port closure by a tear seam which tears when the predetermined tensile tether force is reached. Said tear seam is a simple and inexpensive option for releasing the discharge port passively, i.e. upon exceeding a predetermined tensile force within the port release tether. Especially preferred, the tear seam may interconnect the tether end of the port release tether, the discharge port closure and additionally the airbag or a retaining element of the airbag. In this way, the discharge port closure is reliably held in a defined position at the airbag, when the port release tether is actively released already before the predetermined tensile force is reached.

According to a specific configuration variant of the airbag module, the shaping tether and the port release tether are integrally formed. In this case, for example one of the tethers may integrally branch off the other tether or the two tethers are integrally transformed into each other in the area of their coupling point to the tether release device.

The tether release device is preferably pyrotechnically operated, but it may alternatively also be activated by an electric motor.

Especially preferred, the airbag module is a driver-side front airbag module which is mounted, for example, in the hub area of a steering wheel. The airbag module can also be used otherwise, however, and may be in the form of a passenger airbag module.

Preferably, the discharge port is closed in the initial state of the airbag module and can be exclusively released passively while the airbag reaches a predetermined deployment geometry and the port release tether reaches the predetermined tensile tether force. In this way, the airbag deployment may be additionally adapted with little effort by means of the activation time of the tether release device. If the activation time is after reaching the predetermined tensile tether force in the port release tether, it means that the discharge port has already been released and the active release of the port release tether has no longer any effect on the airbag deployment. If the port release tether is however already actively released before reaching its predetermined tensile tether force, the predetermined tensile tether force irrespective of the deployment geometry of the airbag is no longer reached and the discharge port remains permanently closed. Consequently, three different adaptations of the airbag deployment may be achieved by means of a single tether release device by activating the tether release device at an early time, a late time or not at all.

According to the invention, incidentally the object mentioned in the beginning is also achieved by a method of operating a vehicle occupant restraint system comprising an afore-described airbag module, the vehicle occupant restraint system comprising sensors for detecting predetermined parameters as well as an electronic control unit connected to the sensors for activating the inflator and the tether release device in response to the sensor signals. The method includes the following steps:

a) the electronic control unit releases the inflator based on received sensor signals in order to fill the airbag with generator gas;
b) the tether release device cannot be activated before the inflator has been released and is optionally activated or not activated by the electronic control unit depending on the detected parameters.

According to a method variant, the vehicle occupant restraint system includes a sensor for detecting a size and/or a weight of the vehicle occupant, wherein the tether release device is activated above a predetermined limit size and/or a predetermined limit weight in step b) and is not activated below the predetermined limit size and/or the predetermined limit weight in step b).

According to a further method variant, the vehicle occupant restraint system comprises a sensor for detecting an automated driving mode and/or a distance between the vehicle occupant and the inflator, wherein the tether release device is activated in the automated driving mode and/or above a predetermined limit distance in step b) and is not activated in a manual driving mode and/or below the predetermined limit distance in step b).

Preferably, the activation of the tether release device in step b) when the predetermined limit side and/or the predetermined limit weight of the vehicle occupant is/are exceeded takes place earlier than when the automated driving mode is detected and/or when the predetermined limit distance is exceeded. Starting from the time of triggering the inflator, to this effect different time delays may be stored for the individual parameters in the electronic control unit.

Finally, the invention also comprises a vehicle occupant restraint system for the implementation of the previously described method including an above-mentioned airbag module, wherein the vehicle occupant restraint system comprises a steering wheel as well as sensors for detecting predetermined parameters and an electronic control unit connected to the sensors for activating the inflator and the tether release device in response to the sensor signals, the airbag module being mounted in a hub area of the steering wheel.

BRIEF DESCRIPTION OF THE DRAWINGS

Further features and advantages of the invention will be evident from the following description of a preferred embodiment with reference to the drawings, wherein:

FIGS. 5 to 7 show the airbag deployment operation of the airbag module according to the invention for a tall and/or heavy vehicle occupant; and FIGS. 8 to 12 show the airbag deployment operation of the airbag module according to the invention for a large distance between the vehicle occupant and the airbag module.

DESCRIPTION

Figure 1:
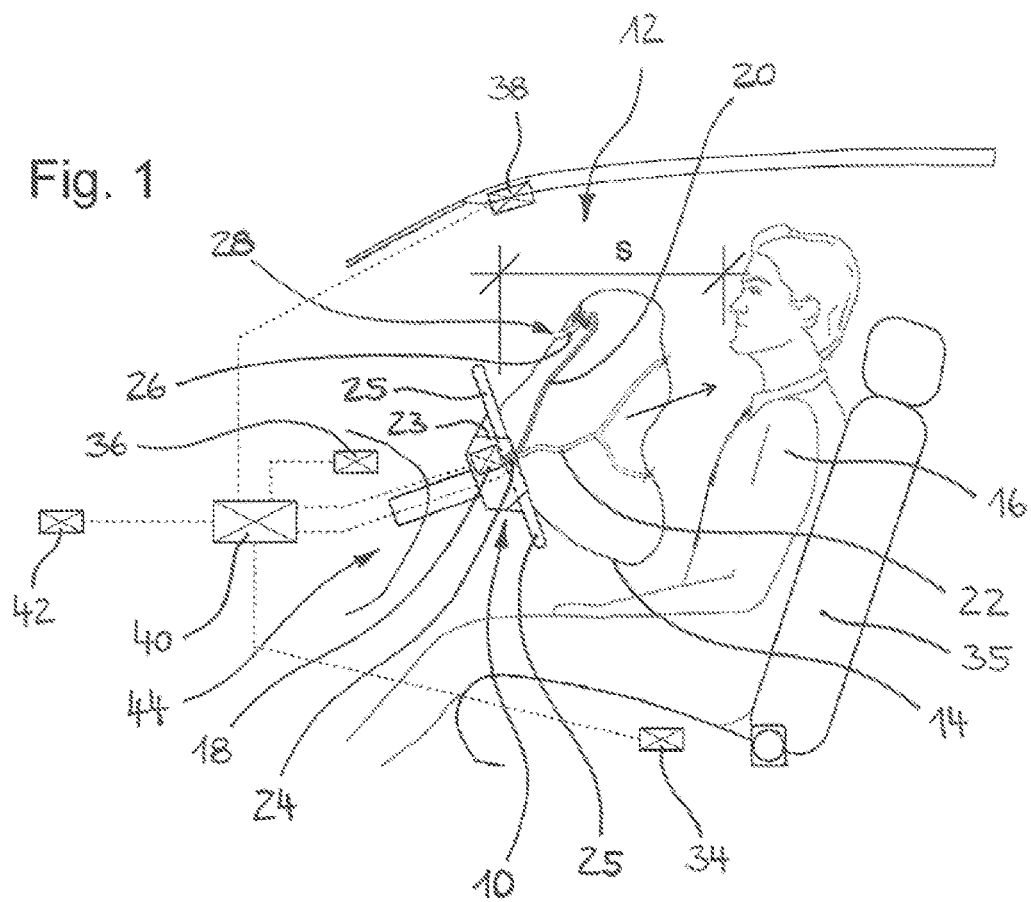
FIGS. 1 to 4 show the airbag deployment operation of an airbag module according to the invention for a small and/or light vehicle occupant.

FIGS. 1 to 12 illustrate an airbag module 10 for a vehicle occupant restraint system 12, comprising an airbag 14 for restraining a vehicle occupant 16, an inflator 18 for filling the airbag 14 with inflator gas, plural tethers 20, 22 and an activatable tether release device 24 coupled to the tethers 20, 22 for simultaneous active release of the tethers 20, 22.

The airbag module 10 further includes a schematically indicated module housing 23 which accommodates the folded airbag 14 and the inflator 18 in the housing interior. The tether release device 24 is an especially pyrotechnically operated device generally known from the state of the art which therefore is equally only schematically indicated in the figures. The tether release device 24 is fastened to a stable module component, such as to the inflator 18 or to the module housing 30, so that the tethers 20, 22 are fastened in an actively detachably manner to the stable module component via the tether release device 24.

In the shown example embodiment, the airbag module 10 is a driver-side front airbag module mounted in the hub area of a steering wheel 25, the airbag module 10 in this case including two tethers 20, 22 each of which extends in the interior of the airbag 14. Each of the tethers 20, 22 is connected, at one tether end, to the airbag 14 or, resp., to a discharge port closure 26 of the airbag 14 and, at an opposite tether end, to the tether release device 24.

Concretely speaking, a port release tether 20 is provided which is fastened to the discharge port closure 26 of the airbag 14 and, from a predetermined tensile tether force, releases a discharge port 28 closed by the discharge port closure 26 in the airbag 14. By releasing the discharge port 28, inflator gas may flow out of the interior of the airbag 14 so that an internal pressure is reduced and the airbag 14 becomes softer.

Figure 2:
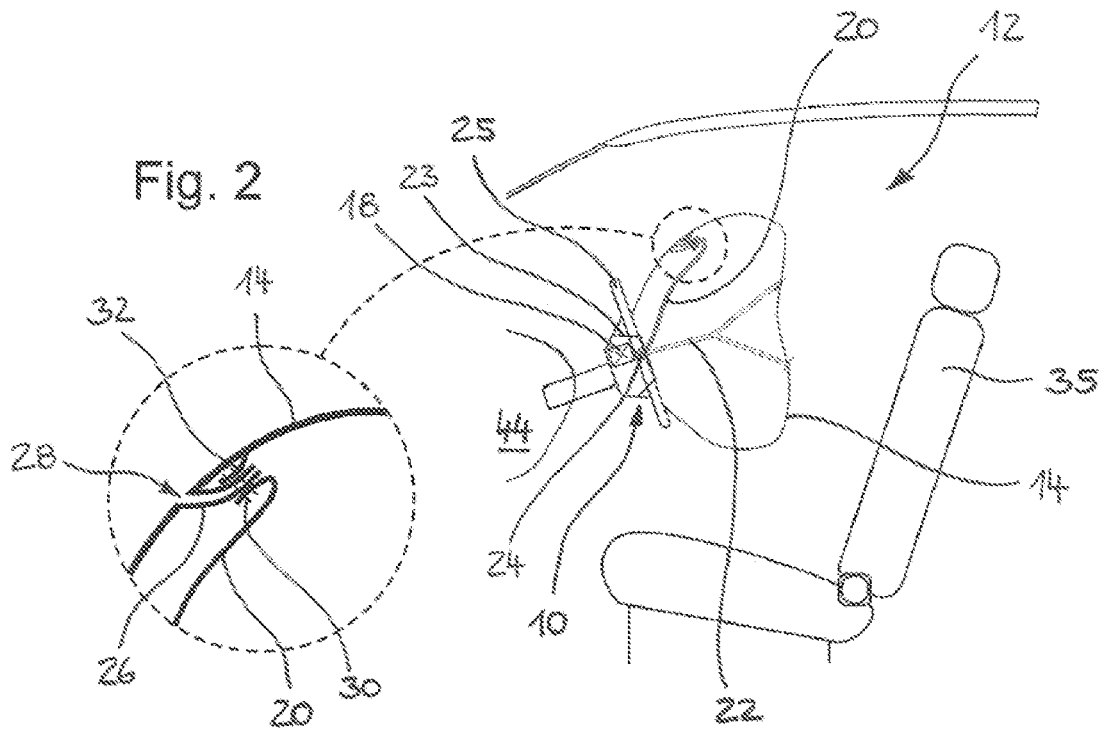

As is clearly evident from the detail of FIG. 2, the tether end of the port release tether 20 is connected to the discharge port closure 26 by a tear seam 30 which tears when the predetermined tensile tether force is reached.

In the present embodiment of the airbag module 10, the tear seam 30 interconnects the tether end of the port release tether 20, the discharge port closure 26 and additionally the airbag 14 or a retaining element 32 of the airbag 14. In this way, the discharge port closure 26 is reliably retained in a defined position at the airbag 14 even when the port release tether 20 is actively released before the predetermined tensile tether force is reached.

The discharge port closure 26 in this case is a snout-shaped extension at the discharge port 28. When the discharge port closure 26 is retained inside the airbag 14, the snout-shaped extension is compressed by the internal airbag pressure upon inflation of the airbag 14 so that the discharge port 28 remains substantially closed. As soon as the discharge port closure 26 is no longer held in the interior of the airbag 14, the snout-shaped extension is inverted inside out by the internal airbag pressure upon inflation of the airbag 14 so that inflator gas may flow to the outside of the airbag 14 via the discharge port 28 and the snout-shaped extension (cf. FIG. 4, for example).

Furthermore, a shaping tether 22 is provided which is fastened at the airbag 14, especially at a front portion of the airbag 14 facing the vehicle occupant 16 and is capable of influencing the airbag deployment geometry, especially an airbag depth t of the airbag 14.

The port release tether 20 and the shaping tether 22 are two separate tethers, according to FIG. 1, each of which is (detachably) coupled at one tether end to the tether release device 24, wherein the shaping tether 22 then branches and includes plural opposite tether ends which are fastened to the front portion of the airbag 14.

Alternatively, it is also imaginable that the port release tether 20 and the shaping tether 22 are integrally formed. In this case, the two tethers 20, 22 are integrally transformed into each other e.g. in the area of their coupling point to the tether release device 24.

In the shown example embodiment the discharge port 28 is closed in an initial state of the airbag module 10 and exclusively released passively while the airbag 14 reaches a predetermined deployment geometry and the port release tether 20 reaches the predetermined tensile tether force. In this way, the airbag deployment may by additionally adapted with little effort by means of the activation time of the tether release device 24. If the activation time is after reaching the predetermined tensile tether force in the port release tether, it means that the discharge port 28 has already been released passively and the active release of the port release tether 20 has no longer any effect on the airbag deployment. If the port release tether 20 is however already actively released before reaching its predetermined tensile tether force, the predetermined tensile tether force irrespective of the deployment geometry of the airbag 14 is no longer reached and the discharge port 28 remains permanently closed. Consequently, three different adaptations of the airbag deployment may be achieved by means of a single tether release device 24 by activating the tether release device 24 at a late time (see FIGS. 8 to 12), an early time (see FIGS. 5 to 7) or not at all (see FIGS. 1 to 4).

Hereinafter, by way of the Figures the method of operating the vehicle occupant restraint system 12 shall be discussed.

The vehicle occupant restraint system 12 comprises, according to FIG. 1, sensors 34, 36, 38, 42 for detecting predetermined parameters as well as an electronic control unit 40 connected to the sensors 34, 36, 38, 42 for activating the inflator 18 and the tether release device 24 in response to the sensor signals.

In the case of crash, the electronic control unit 40 releases the inflator 18 based on received sensor signals so as to fill the airbag 14 with inflator gas (method step a).

The tether release device 24 cannot be activated before the inflator 18 is triggered and is optionally activated or not activated by the electronic control unit 40 in response to the detected parameters (method step b).

In the shown example embodiment, the vehicle occupant restraint system 12 has a sensor 34 for detecting a size and/or a weight of the vehicle occupant 16, wherein the tether release device 24 is activated above a predetermined limit size and/or a predetermined limit weight in step b) and is not activated below the predetermined limit size and/or the predetermined limit weight in step b). The sensor 34 is especially arranged in a vehicle seat 35 of the vehicle occupant 16 and detects, for example, a seat adjustment and/or an occupant weight.

FIGS. 1 to 4 illustrate the deployment operation of the airbag 14 for a small and/or light vehicle occupant 16. According to FIG. 1, in a generally known manner a vehicle crash is detected, for example by a crash sensor 42, and subsequently the inflator 18 is triggered so as to inflate the airbag 14. The sensor 34 detects the vehicle occupant 16 to be less than the predetermined limit size and/or the predetermined limit weight so that the electronic control unit 40 does not activate the tether release device 24 during airbag deployment according to FIG. 2.

Figure 3:
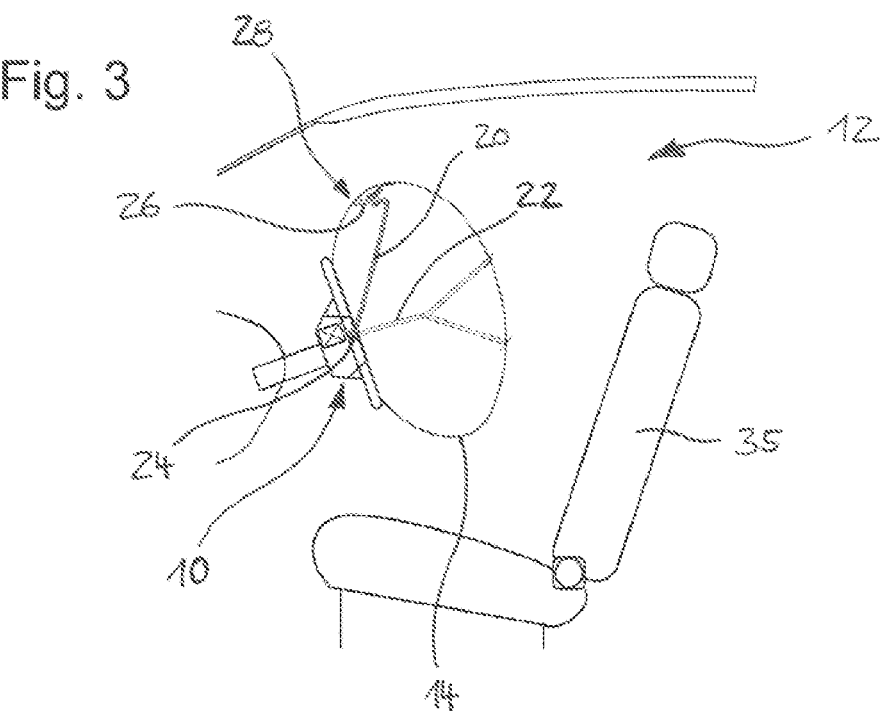
Figure 4:
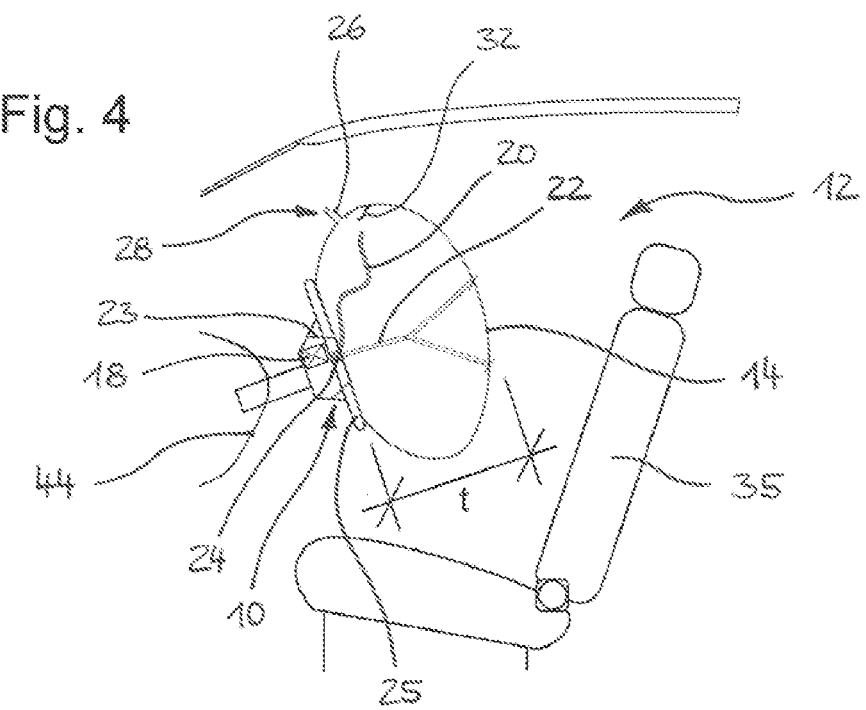
Figure 8:
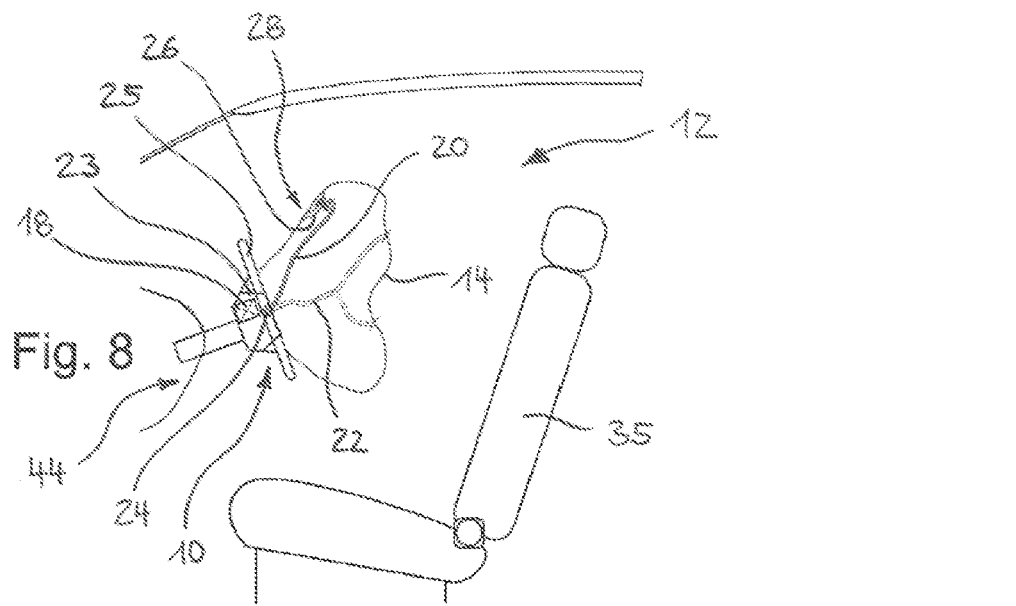
Figure 9:
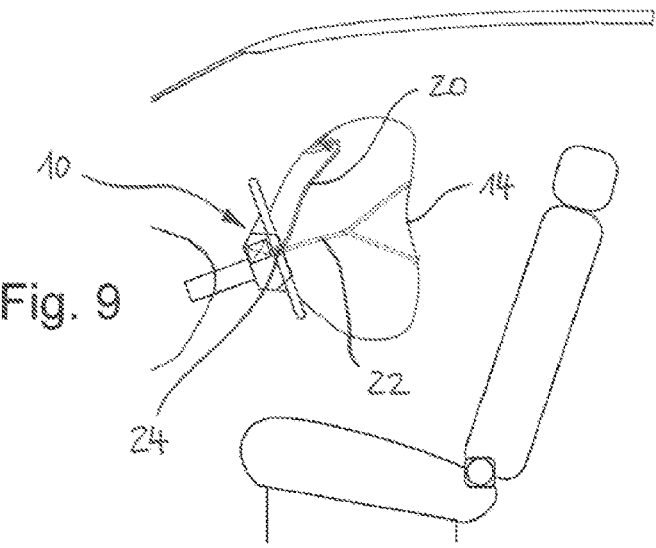
Figure 10:
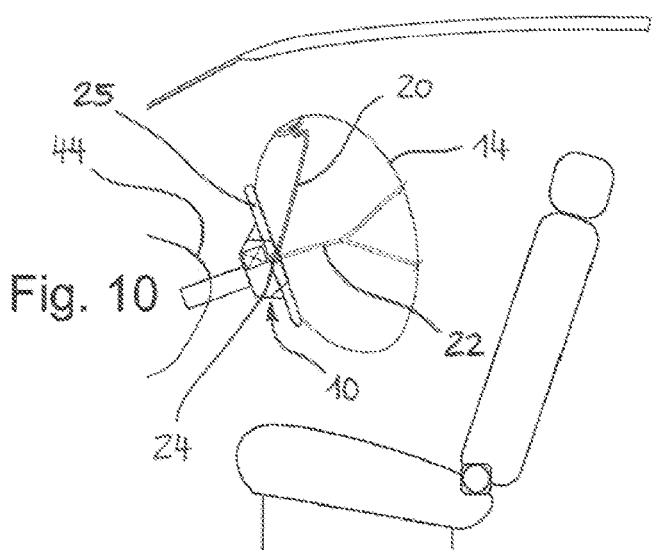

The shaping tether 22 in this case prevents free airbag deployment so that, according to FIG. 3, only a small airbag depth t may form. The discharge port 28 remains initially closed, with the port release tether 20 tensioning upon deployment of the airbag 14 until the tear seam 30 finally tears upon reaching the predetermined tensile tether force and releases the discharge port 28 (FIG. 4). By the release of the discharge port 28 a relatively soft airbag 14 is provided which has turned out to be advantageous for restraining a small and/or light vehicle occupant 16.

On the other hand, FIGS. 5 to 7 illustrate the deployment operation of the airbag 14 for a tall and/or heavy vehicle occupant 16. Initially, again a vehicle crash is detected and then the inflator 18 is triggered so as to inflate the airbag 14. The sensor 34 detects that the vehicle occupant 16 exceeds the predetermined limit size and/or the predetermined limit weight so that the electronic control unit 40 activates the tether release device 24 shortly after triggering the inflator 18 and still during airbag deployment, as indicated in FIG. 5. As a consequence, the shaping tether 22 is released according to FIG. 6 so that the airbag 14 forms a large airbag depth t (FIG. 7). Furthermore, also the port release tether 20 is released so that during airbag deployment no tensile tether force may build up. Consequently, the discharge port closure 26 in the form of a snout-shaped extension remains fixed at the retaining element 32 inside the airbag 14 by the tear seam 30 and the discharge port 28 remains appropriately closed so that sufficient hardness of the airbag is ensured for restraining a tall and/or heavy vehicle occupant 16.

Further, in the illustrated example embodiment, the vehicle occupant restraint system 12 includes a sensor 36 for detecting an automated driving mode as well as a sensor 38 for detecting a distance s between the vehicle occupant 16 and the inflator 18 (cf. FIG. 1), wherein the tether release device 24 is activated in the automated driving mode and/or above a predetermined limit distance in step b) and is not activated in a manual driving mode and/or below the predetermined limit distance in step b).

FIGS. 8 to 12 illustrate the deployment operation of the airbag 14 in an automated driving mode of the vehicle and/or in the case of a large distance s between the vehicle occupant 16 and the inflator 18. The detection of the automated driving mode is usually correlated with a large distance s, as the vehicle occupant 16 frequently sits in a relaxed leaned-back sitting position and/or the steering wheel 25 is pulled toward an instrument panel 44 for reasons of convenience.

After detecting a vehicle crash, the deployment operation according to FIGS. 8 to 11 initially takes place just as described with respect to FIGS. 1 to 4 so that at the beginning a rather soft airbag 14 having a small airbag depth t is formed.

Due to the large distance s no high hardness of the airbag is required, as there is sufficient path available for slower deceleration of the vehicle occupant 16. In order to fully utilize the large distance s for the occupant restraint, finally according to FIG. 12 the tether release device 24 is activated by the electronic control unit 40 to release the two tethers 20, 22. In this way, a relatively soft airbag 14 having a large airbag depth t is formed which enables the vehicle occupant 16 to be restrained in a relatively gentle manner.

What is important in this case is that the tether release device 24 is not activated before the predetermined tensile tether force in the port release tether 20 has already been exceeded and in this way the tear seam 30 has been torn and the discharge port 28 has been released.

By way of the foregoing explanations it is clear that, when a tall and/or heavy vehicle occupant 16 according to FIGS. 5 to 7 is detected, the tether release device 24 is activated earlier in step b) than when the automated driving mode is detected and/or when the predetermined limit distance is exceeded. For this purpose, different individually adapted time delays between triggering the inflator 18 and activating the tether release device 24 may be stored in the electronic control unit for the individual parameters detected by sensors.

When an automated driving mode and/or exceeding of the predetermined limit distance is/are detected, a deployment operation of the airbag 14 according to FIGS. 8 to 12 is initiated by the electronic control unit 40, especially for all vehicle occupants 16 independently of their size and/or weight. Due to the large distance s, even in the case of small and/or light persons the larger airbag depth t can be used to advantageously decelerate the vehicle occupant 16 more slowly and thus to restrain the vehicle occupant 16 more gently.

Overall, in the FIGS. 1 to 12 an vehicle occupant restraint system 12 is proposed as an example which is operated according to the previously described method comprising an airbag module 10 described above, a steering wheel 25 as well as sensors 34, 36, 38, 42 for detecting predetermined parameters and an electronic control unit 40 connected to the sensors 34, 36, 38, 42 for activating the inflator 18 and the tether release device 24 in response to the sensor signals, the airbag module 10 being mounted in the hub area of the steering wheel 25.

The invention claimed is:

1. An airbag module for a vehicle occupant restraint system, comprising
    an airbag for restraining a vehicle occupant,
    an inflator for filling the airbag with inflator gas,
    a shaping tether for influencing the airbag deployment geometry which is connected to the airbag at one tether end, and
    a port release tether which is connected to a discharge port closure of the airbag at one tether end,
    wherein the port release tether is connected to the discharge port closure so that it releases a discharge port of the airbag from a predetermined tensile tether force,
    wherein an activatable tether release device is secured to a stable component of the airbag module and is coupled both to the shaping tether and to the port release tether such that the shaping tether and port release tether are anchored to the stable component of the airbag module, the tether release device, when activated, actively releasing the tethers, and wherein the discharge port is closed in an initial state of the airbag module and can be exclusively released passively while the airbag reaches a predetermined deployment geometry and the port release tether reaches the predetermined tensile tether force.

2. The airbag module according to claim 1, wherein the tether release device is arranged at the inflator or at a module housing so that the shaping tether and the port release tether are detachably fixed on the inflator or the module housing via the tether release device.

3. The airbag module according to claim 1, wherein the tether end of the port release tether is connected to the discharge port closure by a tear seam which tears when the predetermined tensile tether force is reached.

4. The airbag module according to claim 1, wherein the shaping tether and the port release tether are integrally formed.

5. The airbag module according to claim 1, wherein the tether release device is pyrotechnically operated.

6. The airbag module according to claim 1, wherein the airbag module is a driver-side front airbag module.

7. A method of operating a vehicle occupant restraint system including an airbag module according to claim 1, wherein the vehicle occupant restraint system includes sensors for detecting predetermined parameters as well as an electronic control unit connected to the sensors for activating the inflator and the tether release device in response to sensor signals, the method comprising the following steps:

a) the electronic control unit triggers the inflator based on received sensor signals so as to fill the airbag with inflator gas;

b) the tether release device is optionally activated or not activated by the electronic control unit in response to the detected parameters only after the inflator has been triggered, wherein the sensors include a sensor for detecting a size and/or a weight of the vehicle occupant, wherein the tether release device is activated above a predetermined limit size and/or a predetermined limit weight in step b) and is not activated below the predetermined limit size and/or the predetermined limit weight in step b), wherein the sensors include a sensor for detecting an automated driving mode and/or a distance between the vehicle occupant and the inflator, wherein the tether release device is activated in the automated driving mode and/or above a predetermined limit distance in step b) and is not activated in a manual driving mode and/or below the predetermined limit distance in step b), wherein, when the predetermined limit size and/or the predetermined limit weight of the vehicle occupant is exceeded, the tether release device is activated in step b) earlier than when the automated driving mode is detected and/or when the predetermined limit distance is exceeded.

8. A vehicle occupant restraint system for the implementation of the method according claim 7, the vehicle occupant restraint system comprising:
    an airbag module comprising:
    an airbag for restraining a vehicle occupants),
    an inflator for filling the airbag with inflator gas,
    a shaping tether for influencing the airbag deployment geometry which is connected to the airbag at one tether end, and
    a port release tether which is connected to a discharge port closure of the airbag at one tether end,
    wherein the port release tether is connected to the discharge port closure so that it releases a discharge port of the airbag from a predetermined tensile tether force,
    wherein an activatable tether release device coupled both to the shaping tether and to the port release tether is provided for active release of the tethers;
    wherein the vehicle occupant restraint system further comprises a steering wheel, sensors for detecting predetermined parameters, and an electronic control unit connected to the sensors for activating the inflator and the tether release device in response to the sensor signals, the airbag module being mounted in a hub area of the steering wheel.

9. An airbag module for a vehicle, comprising:
    an airbag for restraining a vehicle occupant, the airbag comprising a discharge port that can be opened to release inflator gas from the airbag;
    an inflator for filling the airbag with inflator gas;
    a housing connectable to the vehicle and configured to support the inflator and airbag on the vehicle;
    a shaping tether that is connected to the airbag and configured to influence the airbag deployment geometry;
    a port release tether connected to the discharge port; and
    an actuatable tether release device secured to the vehicle via the airbag module and connected to the shaping tether and the port release tether to anchor the shaping tether and port release tether, wherein the tether release device, when actuated, releases the shaping tether and port release tether from being anchored, wherein the discharge port is closed in an initial state of the airbag module and is configured to be opened passively in response to the port release tether reaching a predetermined tension in response to the airbag reaching a predetermined state of deployment while the port release tether is anchored, wherein the discharge port is configured to remain closed throughout deployment in response to the tether release device being actuated before the port release tether reaches the predetermined tension, wherein the shaping tether is configured to become tensioned and influence the airbag deployment geometry in response to the actuator remaining unactuated, and wherein the airbag is configured to assume an airbag deployment geometry that is free from influence from the shaping tether in response to the tether release device being actuated.

10. A vehicle safety system comprising:
the airbag module as set forth in claim 9;
sensors for detecting predetermined parameters; and
a control unit connected to the sensors and configured to actuate the inflator and the tether release device in response to sensor signals.

11. The vehicle safety system as set forth in claim 10, wherein the sensors comprise a sensor for detecting a size and/or weight of the occupant, wherein the control unit is configured to actuate the inflator and tether release device in response to detecting a size and/or weight of the occupant at or above a predetermined threshold, and to actuate the inflator, but not the tether release device, in response to detecting a size and/or weight below the predetermined threshold.

12. The vehicle safety system as set forth in claim 10, wherein the sensors comprise a sensor for detecting an automated driving mode and/or a distance between the inflator and the vehicle occupant, wherein the control unit is configured to actuate the inflator and tether release device in response to detecting the automated driving mode and/or an occupant positioned at or above a predetermined distance from the inflator, and to actuate the inflator, but not the tether release device, in response to detecting a manual driving mode and/or a an occupant positioned below the predetermined distance from the inflator.

13. The vehicle safety system as set forth in claim 10, wherein the sensors comprise a sensor for detecting an automated driving mode and a sensor for detecting a distance between the inflator and the vehicle occupant, wherein the control unit is configured to actuate tether release device a predetermined time after actuating the inflator in response to detecting the automated driving mode and an occupant positioned at or above a predetermined distance from the inflator, the predetermined time being configured so that the discharge port is opened and the airbag assumes the airbag deployment geometry that is free from influence from the shaping tether.

* * * * *